United States Patent [19]

Nakagawa

[11] Patent Number: 5,689,437
[45] Date of Patent: Nov. 18, 1997

[54] VIDEO DISPLAY METHOD AND APPARATUS

[75] Inventor: Shigeo Nakagawa, Tokyo, Japan

[73] Assignee: NEC Corporation, Tokyo, Japan

[21] Appl. No.: 656,636

[22] Filed: May 31, 1996

[30] Foreign Application Priority Data

May 31, 1996 [JP] Japan ................................. 7-133287

[51] Int. Cl.⁶ ................................................. H04N 9/79
[52] U.S. Cl. ................................. 364/514 A; 395/168
[58] Field of Search ...................... 364/514 A; 395/650, 395/152, 155, 500, 133, 127, 168, 524; 340/815.57; 345/9, 24, 98, 118

[56] References Cited

U.S. PATENT DOCUMENTS 4,306,226 12/1981 Swarbrick ................... 340/815.57
5,388,264 2/1995 Tobias, II et al. ............. 395/650
5,416,899 5/1995 Poggio et al. ................. 395/152

FOREIGN PATENT DOCUMENTS 3-168877 7/1991 Japan .

OTHER PUBLICATIONS

Reynolds, "Computer Animation With Scripts and Actors", Computer Graphics, vol. 16, No. 3, (1982), p. 289–296.

Primary Examiner—Emanuel T. Voeltz
Assistant Examiner—Thomas Peeso
Attorney, Agent, or Firm—Foley & Lardner

[57] ABSTRACT

In a video display method of laying out a plurality of objects in a space, and creating images of the objects in units of frames, thereby displaying a series of videos, geometric attributes of first and second objects, movements of the first and second objects, including changes in the first and second objects, first and second start positions of the movements, and first and second start times of the movements are defined as first and second scenarios. First and second occupied areas occupied when the first and second objects move on the basis of the first and second scenarios are calculated by approximating the ORs of a sequence of areas occupied by the first and second objects when the first and second objects take the movements at the first and second positions and the first and second times on the basis of the first and second scenarios. A common area where the first and second occupied areas cross each other is calculated. The first and second occupied areas and the common area are displayed as video. A video display apparatus is also disclosed.

8 Claims, 3 Drawing Sheets

VIDEO DISPLAY METHOD AND APPARATUS

BACKGROUND OF THE INVENTION

The present invention relates to a video display method and apparatus which create and display animation video which changes on the basis of an operation performed by a user.

Interactive 3-D computer graphics (CG) animation can be realized by creating 3-D CG video in real time. In this technique, the action or movement of an object appearing in an animation is changed in accordance with an input from the user.

For example, interactive 3-D CG animation has the following applications:

① flight/drive simulation;
② 3-D CG games;
③ walk through simulation in which the viewpoint of the user moves within a building; and
④ visual presentation of 3-D objects such as a machine, a human body, and a molecular structure.

Such interactive animation includes a method of setting the execution procedure for the action of each object (script animation). In this method, the execution procedure and timing of the action of an object appearing in an animation are described. A programming language, called a script, which is designed for animation is used for this operation.

In script animation, first of all, the types and execution order of actions, and start conditions for the execution of the actions are described for each object. In executing animation, each script is executed in accordance with an input from the user or the like to determine the type, position, and execution timing of each object. Animation video is then created on the basis of the determined action of each object.

In this script animation, the action of a given object is described with a local coordinate system and time axis to which the given object belongs. The local coordinate system and time axis are then mapped with respect to a global coordinate system to create a final interactive animation.

In script animation, therefore, the action position of each object and its action procedure need not be determined in advance with respect to a global coordinate system and time axis, but can be determined during execution of the animation in accordance with an operation performed by the user. Consequently, script animation allows interactive animation creation processing.

Script animation is described in detail in reference 1 (Craig W. Reynolds, "Computer Animation with Scripts and Actors, Computer Graphics", Vol. 16, No. 3, July 1982, ACM SIGGRAPH, pp. 289–296).

Owing to the above arrangement, the following problem is posed.

In interactive animation like the above script animation, the action data of each object, the action procedure, the layout of the respective objects in a space, and the action start timing of each object are described as scenario data.

When these data are created, and a completed animation is executed, objects appearing in the animation may collide or interfere with each other depending on the action data of each object, the layout in a space, or the action start timing of each object.

In order to prevent such collision between objects, the following methods have been used: a method of positioning objects to keep them spaced apart from each other so as to prevent collision; and a method of creating action data of the respective objects in advance to prevent collision.

In these methods, however, when the user modifies data, he/she cannot know whether collision is prevented. In order to check whether collision can be prevented, he/she must actually execute the animation and observe the created video. According to this method, the user needs to repeat this test until he/she creates data which prevents collision.

In actually executing an animation, all objects do not necessarily take actions defined by scenario data in some execution stage.

Some object may take no action in some animation execution stage.

For this reason, in detecting a collision state by actually executing an animation, the user takes every scene into consideration, and executes the animation in a plurality of stages. The user observes the created video to detect a collision state.

As described above, the conventional technique requires many steps to create scenario data.

SUMMARY OF THE INVENTION

The present invention alleviates the above problem, and has as an object to easily prevent collision or interference between objects appearing in video in creating scenario data.

In order to achieve the above object, according to the present invention, there is provided a video display method of laying out a plurality of objects in a space, and creating images of the objects in units of frames, thereby displaying a series of images, comprising the steps of defining geometric attributes of first and second objects, movements of the first and second objects, including changes in the first and second objects, first and second start positions of the movements, and first and second start times of the movements as first and second scenarios, calculating first and second occupied areas occupied when the first and second objects move on the basis of the first and second scenarios by approximating the ORs of a sequence of areas occupied by the first and second objects when the first and second objects take the movements at the first and second positions and the first and second times on the basis of the first and second scenarios, calculating a common area where the first and second occupied areas cross each other, and displaying the first and second occupied areas and the common area as video.

DESCRIPTION OF THE PREFERRED EMBODIMENTS

An outline of the present invention will be described prior to a description of the embodiments of the present invention. In scrip animation, the following data are defined:

① Movements (actions) with a change in time, e.g., translation, rotation, and deformation, in a local coordinate system are defined with respect to each object appearing in an interactive animation.

② A start condition for the action of each object and its execution order are defined as object data, together with an action procedure.

The defined object data are then described as the scenario data for the interactive animation. In this case, layout data consisting of the position coordinates of each object in a space and the start times of series of actions are described as scenario data in combination with the above data.

According to the present invention, after the layout data of a given object is set, an area through which the object passes from the start of the action of the object to the end of the action is calculated as an occupied area.

The occupied areas of the respective objects appearing in the interactive animation are calculated to check whether a common area exists between the occupied areas.

If it is determined upon this checking operation that a common area exists, a collision will occur between objects having the corresponding occupied areas.

In the present invention, therefore, one or all of this common area, the objects corresponding to the common area, and the occupied areas sharing the common area are displayed as video to a user.

As a result, the user can know the collision between the objects by recognizing the occurrence of the common area as video without actually executing the animation.

Upon recognition of the collision between the objects, the user iteratively changes data such as the spatial coordinates or action timings of the objects until the common area disappears, thereby obtaining a state without any collision between the objects.

During this correcting operation, the user can observe, in real time, how the occupied areas and the common area change in response to an operation performed by the user.

The user can therefore easily know an effective correcting operation for eliminating the common area to prevent collision between the objects.

As described above, in the present invention, the user can detect a collision between objects without actually executing an animation.

That is, by correcting the data of each object until a common area disappears, the user can newly position the objects in a space while preventing any collision between the objects.

In addition, the user can correct the layout data of each object to prevent a collision without repeatedly conducting an actual animation test.

The user can therefore create scenario data for an interactive animation in a very small number of steps.

The first embodiment of the present invention will be described below with reference to the accompanying drawings.

Figure 1:
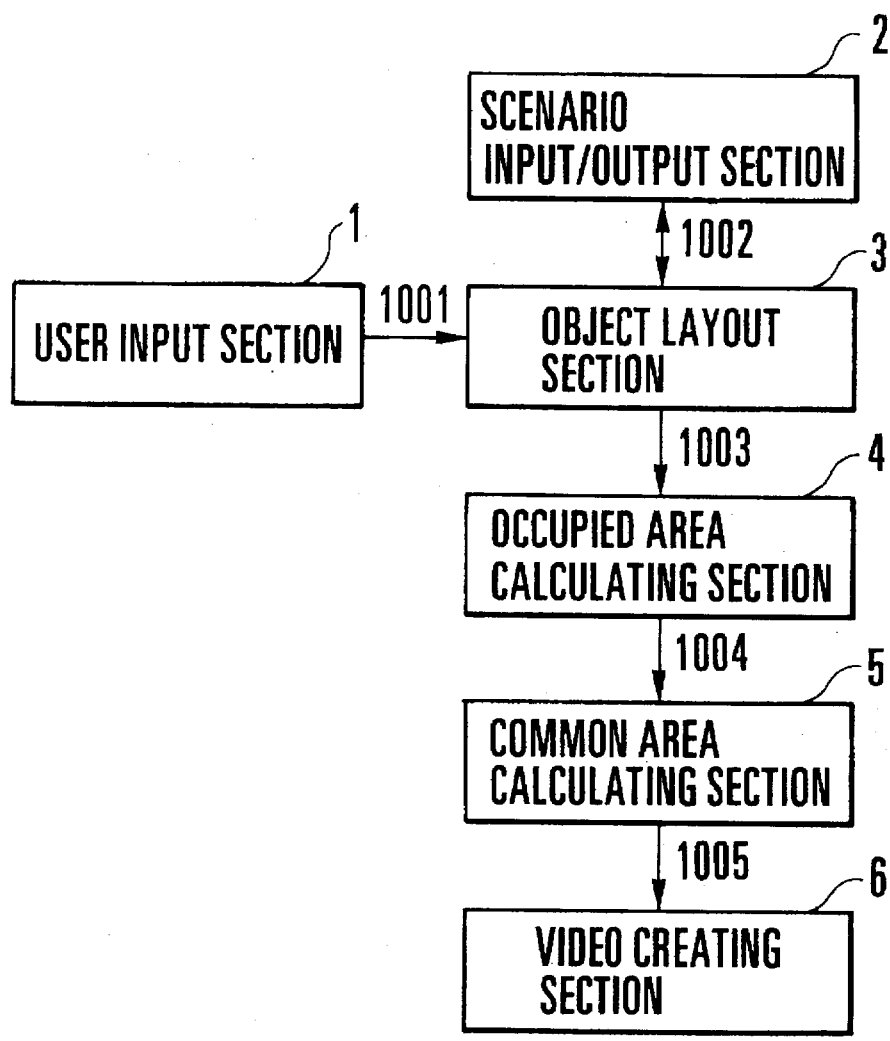
FIG. 1 is a block diagram showing the arrangement of a video display apparatus according to a first embodiment of the present invention.

FIG. 1 shows the arrangement of a video display apparatus according to the first embodiment of the present invention.

In the first embodiment, space and objects appearing in an animation are defined in three-dimensions, and animation video is created by using 3-D computer graphics technique. However, the present invention can also be applied to other embodiments in which an animation is created on a 2-D plane as in the case of a video game of a sprite display scheme. In general, animation video can be created in an N-D (N=1, 2, 3, . . . ) space by using the present invention.

Referring to FIG. 1, a user input section 1 receives data output from a mouse, a keyboard, or a 3-D coordinate input device operated by the user, and outputs it as an user input 1001.

A scenario input/output section 2 receives externally input scenario data (to be described later), and outputs it as a scenario 1002 to an object layout section 3. The scenario input/output section 2 also outputs the scenario 1002 output from the object layout section 3 to an external unit.

For example, the following data can be used as data received by the user input section 1 and the scenario input/output section 2:

① data obtained when the user operates the keyboard, the mouse, or the 3-D coordinate input device;

② data recorded in advance on a storage unit such as a magnetic tape or magnetic disk;

③ data created by another program operating on the the same computer and stored in a memory; and ④ data stored, in a memory, as a communication result between the home computer and another computer or video display apparatus, which are connected to each other via a communication line.

The scenario 1002 will be described prior to a description of display of occupied areas as areas through which objects pass.

As will be described below, the scenario 1002 is data consisting of a combination of (1) geometric attributes, (2) action data, (3) an action procedure, and (4) layout data which are described for every object appearing in an interactive animation.

In the following description, a light source and a viewpoint required to create video using 3-D graphics are handled as objects having special geometric attributes such as luminous intensity distribution characteristics and visual field characteristics in the same manner as the remaining objects.

(1) Geometric Attributes

Geometric attributes include the shape of an object and the brightness and material of the object surface. In addition, the geometric attributes include a texture image for texture mapping and the correlation between the texture image and the object surface.

Of these data, the shape data is described with the coordinate data of a polygon in an object coordinate system or control point data on a spline curved surface. The material of the object surface is described with a chromaticity, a reflection coefficient, or the like.

If an object is made up of object parts, e.g., joints, which are hierarchically connected to each other, management information for a hierarchical relationship and the positional relationship between the object parts are also described as geometric attributes.

(2) Action Data

Action data is movement information about a given object which is defined by a change in the correlation between a coordinate system to which the object belongs and a superordinate or world coordinate system over time.

For example, translation from an object coordinate system to which a given object belongs to a superordinate coordinate system, rotation, scaling (enlargement/reduction), and records (M(t1), M(t2), . . . , M(tn−1), M(tn)) sampled at frame intervals (t1, t2, . . . , tn−1, tn) with respect to a homogenous coordinate matrix M for performing a combination of the above actions can be defined as action data.

If the frame interval is set to a field period (1/60 sec) or frame period (1/30 sec) of the TV broadcasting scheme (NTSC scheme), smooth motion video can be created.

A correlation D(t) equivalent to a homogenous coordinate matrix at time t may be defined by a function D with time t as a parameter, and a combination of the function D and the parameter t may be used as the action data of the object.

For example, the movement of the object may be described with a spline curve function (D) and an input parameter (t).

This spline curve function D(t) is a function for determining the coordinate values (x(t),y(t),z(t)) of one point in a space using the real number parameter t. As a spline curve function, a function known as a Nurbs curve in the field of CAD/CAM can be used.

The Nurbs curve is described in reference 2 (J. D. Foley and A. van Dam and S. K. Feiner and J. F. Hughes, Computer Graphics: Principles and Practice (Second Edition), 1990, Addison Wesley, pp. 501–504).

In addition, movement information corresponding to connection between object parts is defined, and the action of the object can be defined by a set of pieces of movement information.

Such a manner of definition is applied to a case wherein an object is constituted by object parts joined to each other via joints, like an animal, or an object is constituted by object parts hierarchically connected to each other.

When an object is constituted by object parts coupled to each other via joints, in particular, the action of the object may be described with a change in the rotational angle of a joint over time between object coordinate systems defining the object parts.

In addition to the movement of the object within the object coordinate system, the deformation of the object is also handled as an action. In order to express deformation with a change in time, for example, a deformation algorithm for causing deformation and a change in parameter can be described.

For example, when a given object is to be deformed by using linear transformation such as affine transformation, a deformation action can be described with a set of affine transformation matrixes described in the time-serial order.

An operation of 3-D affine transformation is described in reference 2, pp. 213–226.

Deformation based on affine transformation will be briefly described below. Let $T=(T(t1), T(t2), \ldots, T(tn-1), T(tn))$ be the 3-D affine transformation matrix at time $t=(t1, t2, \ldots, tn-1, tn)$. In this case, the shape of the object at each time t is represented by a coordinate value $p'=T(t)p$ at time t with respect to a coordinate value p describing a polygon or spline patch constituting the shape upon affine transformation.

The above movement information (action data) of the object can be described with only parameters as inputs, provided that a movement calculation algorithm is fixed.

If, for example, the above Nurbs curve function is used as a fixed calculation algorithm, movement information can be provided with only with parameters describing control points on a Nurbs curve.

If the calculation algorithm is to be changed, action data is constituted by a combination of an algorithm or an algorithm type and parameters.

In an interactive animation executed while messages are communicated between objects, transmission of a message may be defined as a type of action. An even-driven script animation in which message communication is performed between objects is described in reference 3 (Japanese Patent Laid-Open No. 3-168877).

(3) Action Procedure

In an interactive animation, a plurality of actions are defined in advance for each object, and at the same time, the procedure for executing the actions is described as an action procedure.

In the above script animation, an action procedure is described by using a programming language. For this reason, this animation technique uses an internal variable for state transition to provide an object with an internal state.

More specifically, an action procedure can be described by using C language, LISP language, or a similar procedural programming language. The creator of an interactive animation can describe the action data of each object, the type of action algorithm, the execution timing of each action, the execution order of actions, and start conditions by using these languages.

An action procedure for each object will be described below as a method generally used in an interactive animation such as a script animation.

In an interactive animation, an action procedure is a set of functions for determining actions to be executed among a plurality of actions. Note that a plurality of actions are based on externally input events or messages.

For example, in describing the above operation procedure, a start condition for an action corresponds to a function for determining an action. An action procedure for an interactive animation can be set by describing start conditions in accordance with control structures such as consecutive sequence, loop, conditional branch, and the like.

This action procedure is defined as data describing an action control procedure (e.g., consecutive sequence, conditional branch, and repetition) and the start conditions for the respective actions by using a program.

(4) Layout Data

The geometric attributes and action data of objects are defined with local coordinate systems to which the respective objects belong. In executing an interactive animation, the respective local coordinate systems are arranged in a global coordinate system such as a world coordinate system.

In addition, the action start time of each object is set on a global time axis. Final animation video is created on the basis of the above layout.

For this purpose, coordinate values used to lay out the respective objects in the global coordinate system and on the time axis are defined as layout data.

For example, the layout data of each object can be described with a combination of the following coordinates, times, and the like:

① the amount of spatial translation from the origin of the world coordinate system and a corresponding coordinate value;

② an affine transformation matrix describing rotation about a coordinate axis; and ③ the start time of a series of actions of each object on the global time axis.

Note that the layout relationship between the objects can be set by describing layout data as data corresponding to the immediately superordinate coordinate system instead of the global coordinate system.

For example, this manner of description is applied to a case wherein an independent object is placed in a hierarchical relationship with another object like an object placed on a moving table.

The scenario 1002 is created in the above manner and stored in the object layout section 3.

The object layout section 3 changes the layout data of objects on the basis of the user input 1001 and updates the scenario stored therein.

In laying out the objects, first of all, an object whose layout data, in the updated scenario, is to be changed is selected.

In selecting an object, for example, a video at an arbitrary time in an interactive animation is created. The object selected by the user can be known from a coordinate value indicated by the mouse and input as the user input 1001 by, e.g., a calculation method such as picking.

In this case, picking is a calculation method of searching for and referring to the object to be operated on the basis of the operation result of the pointing device operated by the user.

When, for example, the user clicks an object displayed on the screen of a CRT with a mouse, picking is performed to know the clicked object. In this case, the CRT is displaying an interactive animation. The mouse is a pointing device, which is used to click an object displayed on the CRT to select/designate it.

A technique of realizing picking is described on pp. 48–50 in reference 2.

Of the layout data of each object, the spatial coordinate value of a given object can be changed by the user input 1001 based on, e.g., a method of dragging the object with the mouse.

In addition, as the start time of an action sequence of a given object on the global time axis, a directly input value indicating a time as the user input 1001 may be used. Alternatively, an interactive animation may be executed to create video, the execution is stopped at the time when the object is to be positioned, and the time when the execution is stopped may be input.

As described above, after changing the layout data of a given object and updating the stored scenario, the object layout section 3 outputs the updated scenario as object layout information 1003.

This object layout information 1003 may be output every time the user input 1001 is generated to change layout data upon an operation by the user, or at frame time intervals for video creation.

When the user completes a series of object layout operations to prevent a collision between the objects, the object layout section 3 can also output the object layout information as the scenario 1002 to an external unit. This operation is performed when the object layout section 3 outputs the object layout information to the scenario input/output section 2. Alternatively, the object layout section 3 can output the object layout information as the scenario 1002 to an external unit at an arbitrary time in this process.

Display of occupied areas as areas through which objects pass will be described below.

Upon reception of the object layout information 1003 with the above operation, an occupied area calculating section 4 calculates an occupied area obtained by the geometric shape and action data of an object on the basis of the received information.

Figure 2:
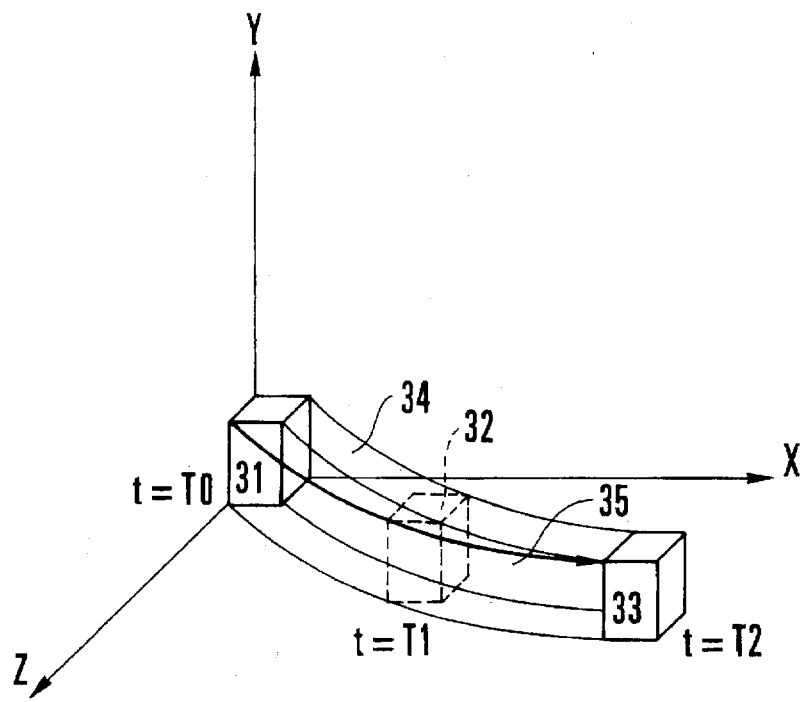
FIG. 2 is a perspective view showing the state of the occupied area of an object which is obtained from geometric attributes, action data, and layout data of the object.

A calculation of a spatially occupied area will be described below. FIG. 2 shows the state of the occupied area of an object, which is obtained by the geometric attributes, action data, and layout data of the object.

Referring to FIG. 2, action data 35 is defined for an object 31 at time t=T0 in a global coordinate system XYZ. As a result, the object 31 moves to positions 32 and 33, respectively, at times t=T1 and T2.

When the action data 35 is executed, the object 31 moves in an occupied area 34 in the global coordinate system.

An occupied area can be defined as a spatial area obtained in the following manner. First of all, an object is converted into data in the global coordinate system, including its movement data, on the basis of the layout data. The object is then subjected to a sweeping operation on the basis of the movement data.

The sweeping operation is described on pp. 540–542 in reference 2. In this case, a 2-D graphic pattern is moved in a 3-D space, and the graphic pattern at each time point in the process of movement is enveloped, thereby calculating a 3-D shape.

In calculating a spatially occupied area in the present invention, a sweeping operation is performed to move the 3-D shape of an object in the 3-D space on the basis of the movement data. The shape at each time point in the process of movement is enveloped to calculate a spatially occupied area.

Referring to FIG. 2, the occupied area 34 may be calculated as a spatial area obtained by, for example, ORing a sequence of spatial areas occupied by the object 31 which are obtained at frame time intervals from t=T0 (action start time of the occupied area 34) to t=T.

For example, a spatially occupied area is defined by expression (1), in which <OR> represents the logical OR operation for shapes in the space:

$$V(T0)<OR>V(T0+d)<OR>\ldots<OR>V(T2-d)<OR>V(T2) \quad (1)$$

In expression (1), d is the video frame interval time (e.g., 1/30 sec). In addition, the spatial area occupied by the object in the space at time t=(T0, T0+d, ..., T2-d, T2) is given by $V(t)=(V(T0), V(T0+d), \ldots, V(T2-d), V(T2))$.

For a logic operation for a shape, a shape definition technique called solid modeling in the field of CAD/CAM can be used. Solid modeling is described on pp. 535–539 in reference 3.

The calculated occupied area can be approximated and expressed by a polygon or a spline curved surface, similar to the geometric attributes of the object.

In calculating an occupied area, spatial or time sampling or approximation may be performed.

For example, the shapes of the object sampled at times t=T0, T1, and T2 may be calculated as spatial areas which are approximated to a certain degree, like minimum rectangular parallelepipeds (bounding boxes) each containing and surrounding the object.

If, for example, the frame interval time d in expression (1) is set to be large, a spatially occupied area sampled along the time axis can be calculated. For example, calculation is performed after d is changed to 2d. As a result, the amount of calculation for obtaining an occupied area can be reduced.

In this case, the sampling interval need not be constant. The sampling interval may be shortened when the moving speed of an object is high (a change in position over time is large). The sampling interval may be prolonged when the moving speed is low (a change in position over time is small). In this manner, the sampling interval can be adaptively set.

In addition, spatial approximation can be performed by using a relatively simple geometric shape as V(T) in expression (1) instead of an object shape. As a relatively simple geometric shape, for example, a bounding box as the object or a spherical shape surrounding the object can be used. As a result, the amount of calculation for obtaining an occupied area can be reduced.

Note that spatial approximation and the above time sampling can be used together.

In the case shown in FIG. 2, the object 31 has only one action data. If, however, the object 31 can select a plurality of action data upon interacting with the user, occupied areas corresponding to the movements as the respective choices may be calculated, and the OR of the calculated areas may be set as the occupied area of the object 31.

If an object moves for a long period or over a wide spatial area, the resultant occupied area becomes very large.

In this case, for example, of the action data, time divisions for calculating occupied areas are set. This operation will help the user to understand the state of the object in visualizing an occupied area.

In calculating an occupied area at an arbitrary time, in particular, calculation for an occupied area at a portion corresponding to movement data before the arbitrary time may be omitted.

As described above, the occupied area calculating section 4 calculates the occupied area of an object, and outputs the calculation result as space occupation information 1004, together with the object layout information 1003.

The common area calculating section 5 calculates a common area between the occupied areas of the respective objects on the basis of the space occupation information 1004.

Figure 3:
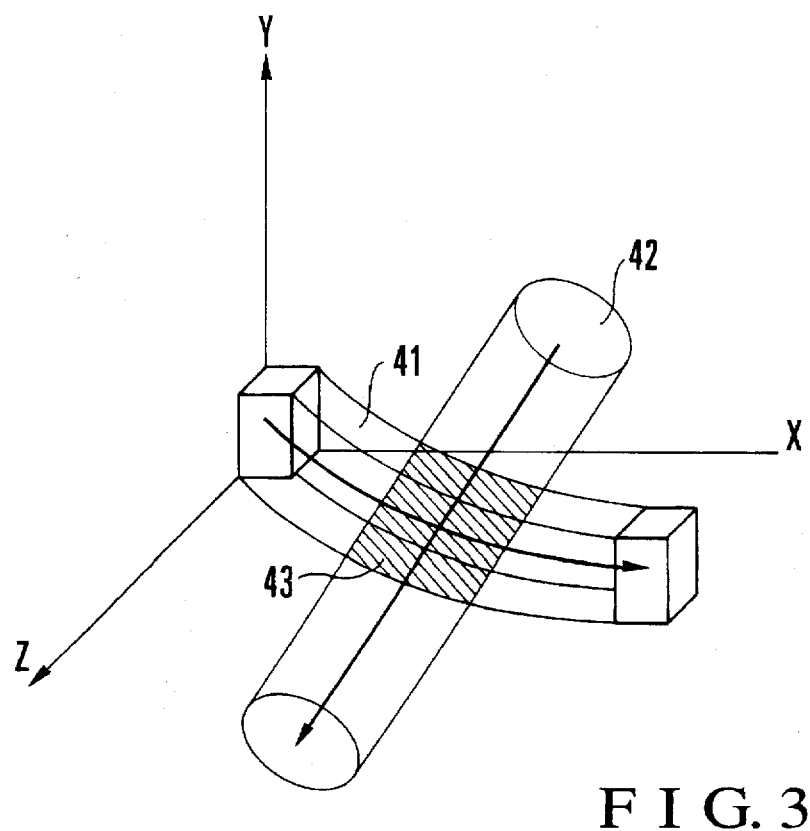
FIG. 3 is a perspective view showing the state of a common area between the occupied areas of objects.

FIG. 3 shows the state of a common area between the occupied areas of objects.

Referring to FIG. 3, occupied areas 41 and 42 share a common area 43 indicated by hatching in the global coordinate system XYZ.

The common area 43 can be calculated by obtaining a spatial area as the AND between the occupied areas.

Similar to the case of an occupied area, the calculated common area 43 can be approximated and expressed by a polygon or a spline curved surface. This calculation for the common area can be performed by an AND operation using the above solid modeling.

As described above, the common area calculating section 5 calculates the common area, and outputs the calculation result as space common information 1005, together with the space occupation information 1004.

A video creating section 6 creates images at frame intervals on the basis of the scenario data of the object described in the space common information 1005, the occupied area, and the common area.

The video creating section 6 displays an object and an occupied area as a locus area based on the above action using a series of created images. In addition, the video creating section 6 displays a state of collision between objects as a common area where occupied areas overlap.

The video creating section 6 creates images by performing a series of image creating operations based on a 3-D computer graphics technique. These operations are performed on the basis of objects including a viewpoint and a light source, occupied areas, the position and shape of a common area in a space, and the attributes of surfaces. Note that the 3-D computer graphics technique includes coordinate transformation, clipping, luminance calculation, perspective projection calculation, shading, and hidden-surface removal.

In this case, the occupied areas and the common area may be videos for which different display attributes are set. For example, the chromaticity of a video is changed, or the video is made semi-transparent, or the contour line of an area is displayed.

Such an operation allows the user to easily understand the positional relationship between objects and the positional relationship between the areas of the objects.

As described above, according to this embodiment, occupied areas associated with objects appearing in an animation and a common area between the occupied areas are displayed. In addition, the occupied areas and the common area are changed and displayed in accordance with changes in the attributes and data of the objects upon input operations by the user.

The user can therefore lay out the objects in the global space along the time axis such that no common area is formed between the occupied areas created as video.

That is, the user can lay out objects while preventing a collision therebetween without executing an animation.

In addition, the scenario obtained after layout processing can be output to an external unit via the scenario input/output section 2.

Second Embodiment

The second embodiment of the present invention will be described next.

Figure 4:
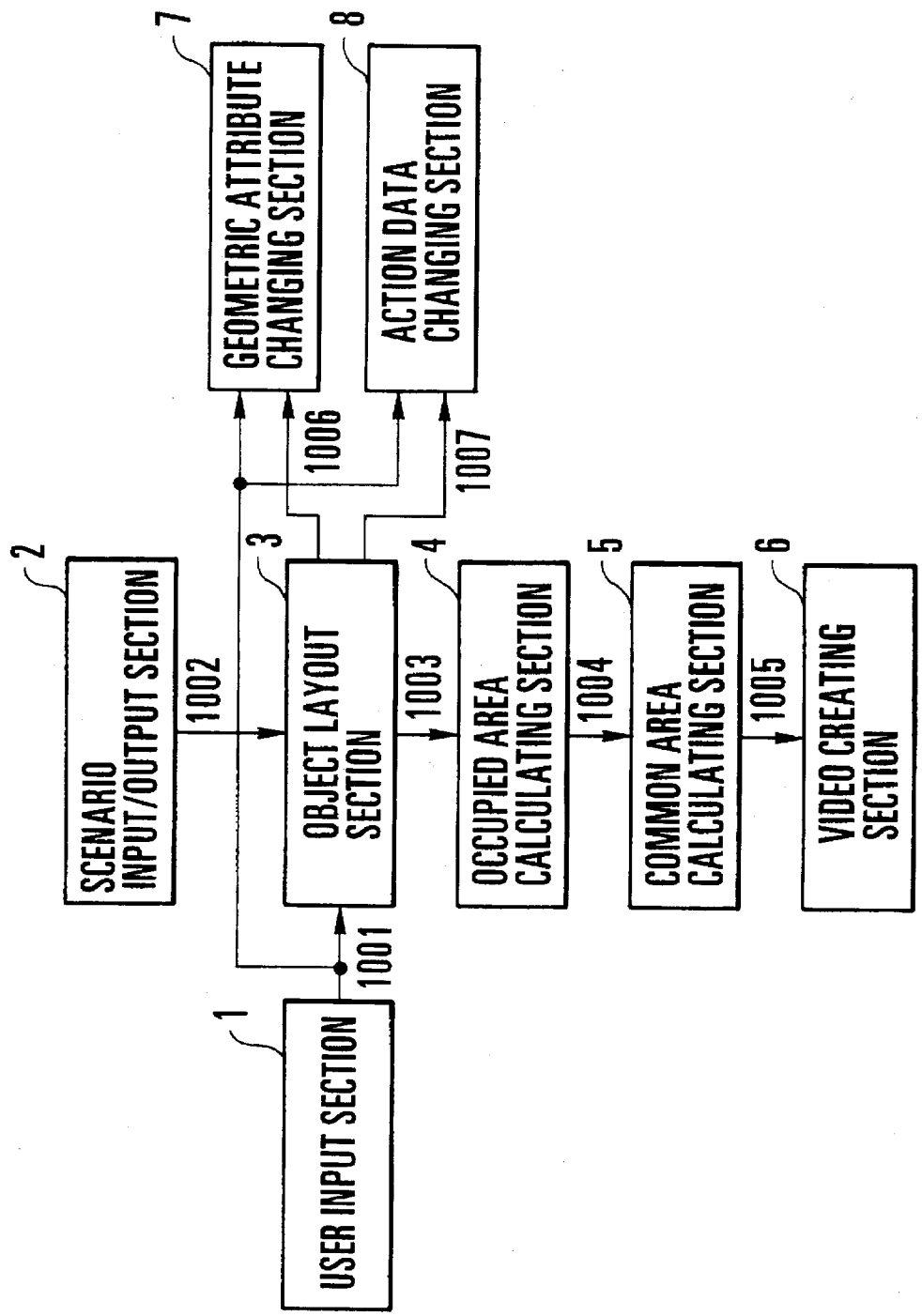
FIG. 4 is a block diagram showing the arrangement of a video display apparatus according to a second embodiment of the present invention.

FIG. 4 shows the arrangement of a video display apparatus according to the second embodiment of the present invention.

The video display apparatus according to the second embodiment is characterized in that a geometric attribute changing section 7 and an action data changing section 8 are added to the arrangement of the first embodiment.

The geometric attribute changing section 7 reads out the geometric attributes of objects of the scenario stored in an object layout section 3. The geometric attribute changing section 7 changes the readout geometric attributes on the basis of an user input 1001. The geometric attribute changing section 7 then updates the geometric attributes of the scenario stored in the object layout section 3 on the basis of a geometric attribute 1006 as a change result.

Similarly, the action data changing section 8 reads out the action data of an object of the scenario stored in the object layout section 3. The action data changing section 8 changes the readout action data on the basis of the user input 1001. The action data changing section 8 then updates the action data of the scenario stored in the object layout section 3 on the basis of action data 1007 as a change result.

The object layout section 3 outputs the object layout information 1003 every time the stored scenario is updated by the geometric attribute changing section 7 and the action data changing section 8, similar to the case wherein the layout data of an object is changed.

With the above operation, when a collision between objects in a scenario cannot be prevented by changing layout data alone, the user can change the shape of the occupied area of each object by changing the geometric attributes and the action data.

This operation can increase the degree of freedom in changing scenario data to prevent a collision between objects. Scenario data can be created in accordance with the user's intentions.

As has been described above, according to the present invention, the geometric attributes of first and second objects, the movements of the first and second objects, including changes in the first and second objects, the first and second action start positions, and the first and second start times are defined as scenarios of the first and second objects.

The ORs of a sequence of areas occupied by the first and second objects when they move at the first and second positions and the first and second times in accordance with the first and second scenarios are approximated, and first and second occupied areas occupied by the first and second objects when they move on the basis of the first and second scenarios are calculated.

A common area where the obtained first and second occupied areas cross each other is calculated, and the first and second occupied areas and the common area are displayed as video.

As a result, according to the present invention, in accordance with the presence/absence of a common area between the occupied areas of objects, the user can know a collision between the objects in advance. The user can therefore detect the collision between the objects without executing an animation a plurality of number of times considering a plurality of actual situations.

When a common area is formed, the user can change the layout of objects in a global coordinate system and the movement start timings of the objects while watching real-time created video so as to eliminate the common area.

For this reason, the user need not repeat an actual animation test to prevent a collision between objects.

The user can therefore create scenario data for an interactive animation with a very small number of steps.

What is claimed is:

1. A video display method of laying out a plurality of objects in a space, and creating images of the objects in units of frames, thereby displaying a series of images, comprising the steps of:

defining geometric attributes of a first object and a second object, respective movements of the first and second objects, including respective changes in the first and second objects, respective first and second start positions of the movements, and respective first and second start times of the movements as respective first and second scenarios;

calculating respective first and second occupied areas occupied when the first and second objects move on the basis of the first and second scenarios by approximating a logical OR of a sequence of areas occupied by the first and second objects when the first and second objects take the movements at the first and second positions and the first and second times on the basis of the first and second scenarios;

calculating a common area where the first and second occupied areas cross each other; and displaying the first and second occupied areas and the common area as video.

2. A method according to claim 1, further comprising the steps of:

changing the geometric attributes and action data of the objects of the first and second scenarios;

calculating a common area where the first and second occupied areas cross each other by using a change result; and displaying the first and second occupied areas and the common area as video.

3. A video display method according to claim 1, wherein the plurality of objects are three-dimensional.

4. A video display method according to claim 1, further comprising the step of:

interactively repeating the steps of defining geometric attributes of the first and second objects, calculating first and second occupied areas, calculating a common area, and displaying the common area as video, until the common area is eliminated.

5. A video display apparatus for laying out a plurality of objects in a space, and creating images of the plurality of objects in units of frames, thereby displaying a series of images, comprising:

a user input section for receiving an instruction input by a user;

a scenario input/output section for inputting/outputting a scenario constituted by geometric attributes of the plurality of objects, movements of the plurality of objects, including changes in the plurality of objects, start positions of the movements, and start times of the movements;

an object layout section for changing and outputting the scenario in accordance with the instruction input by the user;

an occupied area calculating section for calculating a first occupied area occupied by a first object of the plurality of objects when the first object moves on the basis of the scenario by approximating a logical OR of a sequence of areas occupied by the first object when the first object takes the movement in accordance with the scenario output from the object layout section;

a common area calculating section for calculating a common area between the first occupied area and a second occupied area of a second object of the plurality of objects; and a video creating section for displaying both the first and second occupied areas and the common area.

6. An apparatus according to claim 5, further comprising:

a geometric attribute changing section for changing the geometric attributes of the plurality of objects of the scenario stored in the object layout section based on the instruction from the user input section; and an action changing section for changing and updating an action data of the plurality of objects of the scenario stored in the object layout section on the basis of the instruction from the user input section.

7. A video display apparatus according to claim 5, wherein the plurality of objects are three-dimensional.

8. A method of laying out and displaying animation display objects in a space, the method comprising:

defining a geometric attributes of a first graphic object and a second graphic object, the geometric attributes including respective movements of the first and the second graphics objects corresponding to an animation scenario;

calculating a first occupied area and a second occupied area based on the respective movements of the first graphic object and the second graphic object in accordance with the animation scenario;

calculating a common area based on an intersection of the first occupied area and the second occupied area; and displaying the common area and both the first occupied area and the second occupied area on a video display.

* * * * *